(12) United States Patent
DiGiovanni et al.

(10) Patent No.: US 6,422,043 B1
(45) Date of Patent: Jul. 23, 2002

(54) METHOD OF MAKING AN IMPROVED MULTIMODE OPTICAL FIBER AND FIBER MADE BY METHOD

(75) Inventors: David John DiGiovanni, Montclair; Steven Eugene Golowich, New Providence, both of NJ (US); Sean L. Jones, Clarkston, GA (US); William Alfred Reed, Summit, NJ (US)

(73) Assignee: Fitel USA Corp.

( * ) Notice: Subject to any disclaimer, the term of this patent is extended or adjusted under 35 U.S.C. 154(b) by 0 days.

(21) Appl. No.: 09/440,763

(22) Filed: Nov. 16, 1999

(51) Int. Cl.$^7$ .............................................. C03B 37/075
(52) U.S. Cl. ......................................... 65/402; 65/403
(58) Field of Search .................................. 65/402, 403

(56) References Cited

U.S. PATENT DOCUMENTS

| | | | |
|---|---|---|---|
| 3,902,089 A | * 8/1975 | Beasley et al. | 313/105 CM |
| 3,909,110 A | 9/1975 | Marcuse | 350/96 |
| 3,912,478 A | 10/1975 | Presby | 65/2 |
| 3,969,016 A | 7/1976 | Kaiser et al. | 350/96 |
| 3,980,459 A | 9/1976 | Li | 65/18 |
| 3,982,916 A | 9/1976 | Miller | 65/3 |
| 4,017,288 A | 4/1977 | French et al. | 65/2 |
| 4,028,081 A | 6/1977 | Marcatili | 65/2 |
| 4,038,062 A | 7/1977 | Presby | 65/2 |
| 4,049,413 A | 9/1977 | French | 65/3 |
| 4,093,343 A | 6/1978 | Hargrove | 350/96.3 |
| 4,176,911 A | 12/1979 | Marcatili et al. | 350/96.31 |
| 4,308,045 A | * 12/1981 | Miller | 65/403 |
| 4,504,300 A | 3/1985 | Gauthier et al. | 65/10.1 |
| 4,978,377 A | * 12/1990 | Brehm et al. | 65/403 |
| 5,149,349 A | * 9/1992 | Berkey et al. | 65/403 |
| 5,180,410 A | * 1/1993 | Berkey | 65/403 |
| 5,221,307 A | * 6/1993 | Takagi et al. | 65/403 |
| 5,298,047 A | 3/1994 | Hart, Jr. et al. | 65/3.11 |
| 5,411,566 A | * 5/1995 | Poole et al. | 65/402 |
| 5,482,525 A | * 1/1996 | Kajioka et al. | 65/398 |
| 5,776,223 A | * 7/1998 | Huang | 65/437 |

FOREIGN PATENT DOCUMENTS

WO      97/08791    * 3/1997

OTHER PUBLICATIONS

Okamoto et al., *IEEE Transactions on Microwave Theory and Techniques*, "Computer–Aided Synthesis of the Optimum Refractive–Index Profile for a Multimode Fiber", vol. MTT–25, No. 3, pp. 213–221, Mar. 1977.

Geshiro et al., *IEEE Transactions on Microwave Theory and Techniques*, "Truncated Parabolic–Index Fiber with Minimum Mode Dispersion", vol. MTT–26, No. 2, pp. 115–119, Feb. 2, 1978.

Olshansky, *Applied Optics*, "Mode Coupling Effects in Graded–Index Optical Fibers", vol. 14, No. 4, pp. 935–945, Apr. 1975.

Payne et al., *IEEE Journal of Qunatum Electronics*, "Development of Low–and High–Birefringence Optical Fibers", vol. QE–18, No. 4, pp. 477–487, Apr. 1982.

Olshansky, *Reviews of Modern Physics*, "Propagation in Glass Optical Waveguides", vol. 51, No. 2, pp. 341–367, Apr. 1979.

* cited by examiner

Primary Examiner—Sean Vincent
(74) Attorney, Agent, or Firm—Eugen E. Pacher; Martin I. Finston (57) ABSTRACT

Our method of making high bandwidth silica-based multimode optical fiber comprises provision of a non-circular preform, and drawing fiber of chiral structure from the preform. The non-circular preform can be made by maintaining the inside of the tubular preform under reduced pressure during at least part of the collapse, resulting in a non-circular core and cladding. It can also be made by removal (e.g., by grinding or plasma etching) of appropriate portions of the preform, resulting in a circular core and non-circular cladding. In the latter case, fiber is drawn at a relatively high temperature such that, due to surface tension, the cladding assumes substantially circular shape and the core assumes a non-circular shape. The chiral structure is imposed on the fiber in any appropriate way, e.g., by twisting during fiber drawing the fiber alternately in clockwise and couterclockwise sense relative to the preform.

6 Claims, 6 Drawing Sheets

OFFSETS 0, +/-5, +/-10, +/-15, AND +/-20 MICRONS (FROM BOTTOM)

FIG. 7

OFFSETS 0, +/-5, +/-10, +/-15, AND +/-20 MICRONS (FROM BOTTOM)

FIG. 8

OFFSETS 0, +/-5, +/-10, +/-15, AND +/-20 MICRONS (FROM BOTTOM)

FIG. 9

OFFSETS 0, +/-5, +/-10, +/-15, AND +/-20 MICRONS (FROM BOTTOM)

METHOD OF MAKING AN IMPROVED MULTIMODE OPTICAL FIBER AND FIBER MADE BY METHOD

FIELD OF THE INVENTION

This invention pertains to methods of making multimode silica-based optical fibers, and to fibers made by the method.

BACKGROUND OF THE INVENTION

Multimode (MM) silica-based optical fiber is well known. Briefly, such fiber has a core that is contactingly surrounded by a cladding. The core has an effective refractive index greater than the refractive index of the cladding. The core radius and the refractive indices of core and cladding material are selected such that the optical fiber supports two or more (typically hundred or more) guided modes at an operating wavelength, e.g., 0.85 or 1.3 $\mu$m. Guided modes are conventionally designated $LP_{v\mu}$, where the azimuthal mode number v is an integer greater than or equal to zero, and the radial mode number $\mu$ is an integer equal to or greater than 1. $LP_{01}$ is the fundamental mode, and all other modes are higher order modes. The total number N of guided modes supported by a given MM fiber is approximately equal to $V^2/2$, where V is the normalized frequency parameter (V—number) of the fiber.

It is well known that a MM fiber with appropriately graded core refractive index can have substantially greater bandwidth than a similar MM fiber with step index profile. In particular, a conventional core refractive index profile is expressed by $$\frac{(n(r) - n_{clad})}{n(r)} = \Delta(1 - (r/r_{core})^\alpha),$$

where r is the radial coordinate, $r_{core}$ is the core radius, $n_{clad}$ is the refractive index of the cladding adjacent to the core, $\Delta$ is the normalized refractive index difference between the center of the core and the cladding (with correction for undesired index dip), and $\alpha$ is a free parameter. For $\alpha=2$, the profile is referred to as a parabolic one. The optimal choice of $\alpha$ and $\Delta$ depend inter alia on the properties of the materials that make up the optically active portion of the MM fiber and on the intended application. Frequently, $\alpha$ is about 2.

Efforts have been made to develop fiber index profiles that yield high bandwidth to equalize the transit times of high order modes in a multi-mode fiber and to compensate for the center dip. See for instance, K. Okamoto et al., *IEEE Trans. Microwave Theory and Techniques*, Vol. MTT-25, No. 3 (March 1977), at p. 213, and M. Geshiro et al., IEEE Trans. Microwave Theory and Techniques, Vol. MTT-26(2), 1978, p. 115.

During the early days of optical fiber, many patents that pertain to mode coupling in MM fibers and/or to methods of enhancing such mode coupling were issued. For instance, U.S. Pat. No. 3,909,110 discloses step index MM fiber waveguides with intentional fluctuations of the core refractive index. U.S. Pat. No. 3,912,478 discloses introduction of geometrical variations into the fiber by means of gas streams directed against the fiber as it is being drawn. U.S. Pat. No. 3,969,016 discloses mode coupling by means of an enveloping outer jacket which is selectively deformed. U.S. Pat. No. 3,980,459 discloses insertion of a glass rod into the preform during deposition of the core material, resulting in fiber having a longitudinally eccentric index inhomogeneity. U.S. Pat. No. 3,982,916 discloses a preform manufacturing process that involves asymmetric heating to produce circumferentially alternating deposits of doped and undoped glass, the resulting fibers having longitudinal, eccentric, azimuthal index inhomogeneities.

U.S. Pat. No. 4,017,288 discloses a technique for producing optical fibers with longitudinal variation in index of refraction. U.S. Pat. No. 4,028,081 discloses a helical optical fiber loosely confined in a protective sheath. U.S. Pat. No. 4,038,062 discloses a MM optical fiber with reduced modal dispersion as a result of enhanced mode coupling, achieved by means of one or more modulated heat sources. U.S. Pat. No. 4,049,413 discloses a method for producing optical fibers with diameter variations in the core but with uniform overall diameter. The method involves etching of grooves into the preform. U.S. Pat. No. 4,093,343 discloses optical fiber with deliberately induced intermodal coupling, with longitudinally varying perturbations in the fiber. U.S. Pat. No. 4,176,911 discloses a MM optical fiber having a graded profile region followed by an abrupt drop in index, following by a region of constant index. At predetermined intervals the fiber is modified to have a conventional graded index profile.

Co-assigned U.S. patent application Ser. No. 09/326,960, filed Jun. 7, 1999 by S. E. Golowich et al for "Multi-Mode Optical Fiber Having-Improved Refractive Index Profile and Devices Comprising Same", discloses NM fiber having a refractive index profile that differs from a conventional $\alpha$-type profile by at least one of i) a step formed in the index profile at the core/cladding boundary, in conjunction with a linear correction; (ii) a ripple near the core/cladding boundary, in combination with a linear correction, with or without an index step; and iii) an annular ridge formed in the index profile with a center dip.

Thus, the art knows techniques that may yield MM fiber with significant mode coupling and thus with relatively high bandwidth. However, there is still a need for techniques that are effective for increasing maximum bandwidth and for increasing the yield of fiber of average bandwidth, that are manufactureable and can be easily incorporated into currently used fiber manufacturing processes. This application discloses such techniques. All herein cited references are incorporated herein by reference.

It is known from the theory of MM fibers that, if a mechanism exists that thoroughly mixes the modes within a given mode group, and also thoroughly mixes the mode groups, then high bandwidth can be realized without careful grading of the core refractive index. See, for instance, R. Olshansky, *Applied Optics*, Vol. 14(4), April 1975, p.935. All the modes of a mode group have the same propagation constant $\beta$, and different mode groups have different propagation constants.

The above theoretical prediction has been confirmed in plastic MM optical fibers, where high bandwidths (e.g., ~5GHz km) have been measured on fibers with non-optimal grading of the core index.

It will be appreciated that plastic fiber inherently has severe mode mixing. On the other hand, measurements of silica-based MM optical fibers show that in conventional silica-based fibers relatively little mixing occurs within mode groups and between mode groups.

GLOSSARY AND DEFINITIONS

"Chirality" and related terms such as "chiral structure" are used herein in the conventional sense, as referring respectively to "handedness" and "handed structure".

"Preform" herein can refer to the preform tube before collapse as well as the shaped or unshaped preform rod after collapse. The meaning will be clear from the context.

SUMMARY OF THE INVENTION

Broadly speaking, the invention is embodied in a method of making silica-based MM optical fiber having high bandwidth, typically greater than 100 MHz·km.

More specifically, the invention is embodied in a method of making a silica-based MM optical fiber having a core and a cladding that contactingly surrounds the core, the core having a radially varying refractive index. The method comprises providing a silica-based optical fiber preform, and drawing the optical fiber from the preform. Significantly, at least a portion of the preform has a non-circular cross section, and the drawing step comprises drawing the fiber from the preform such that the drawn fiber has a chiral structure. Associated with the chiral structure typically is a repeat length or period. The repeat length typically is 10 cm or less, and typically varies along the length of the fiber.

In a preferred embodiment, the non-circular preform rod with non-circular core is formed by collapsing the tubular preform while maintaining a reduced pressure in the tube. In another embodiment, a non-circular core is formed by selective removal of glass (e.g., by grinding or by plasma etching) from the outside of the preform rod, followed by fiber drawing at relatively high temperature such that the resulting fiber has substantially circular cross-section, but with a non-circular core.

In either case, a chiral structure is introduced into the fiber during drawing, generally by twisting of the fiber relative to the preform, or by twisting of the preform relative to the fiber. In a preferred embodiment the fiber is twisted alternately clockwise and counterclockwise with respect to the preform, substantially as disclosed in U.S. Pat. No. 5,298,047.

The presence of a non-circular core, preferably together with the chirality introduced during fiber draw, typically results in significant mode coupling and, consequently, in high bandwidth of the fiber, as well as in reduction of the sensitivity of the bandwidth to the details of the index profile. In a further exemplary embodiment of the invention the index profile differs from a conventional parabolic or near-parabolic one, and is selected such that, in combination with the non-circular core and the imposed chirality, the mode mixing and consequent high bandwidth are increased. Exemplarily, the index profile is as disclosed in the above referenced 09/326,960 U.S. patent application. The increase in bandwidth can be realized using either an overfilled mode launch or with a restricted mode launch or both.

The invention is also embodied in an article that comprises silica-based MM optical fiber having non-circular cross section and chirality sufficient to cause mode coupling between modes in a given mode group, and between mode groups of the MM fiber, such that the MM fiber has large bandwidth. Exemplarily, the article is an optical fiber communication system, e.g., an optical fiber local area network (LAN).

BRIEF DESCRIPTION OF THE DRAWINGS

The figures that depict objects are not intended to be to scale or in proportion.

DETAILED DESCRIPTION

Figure 1:
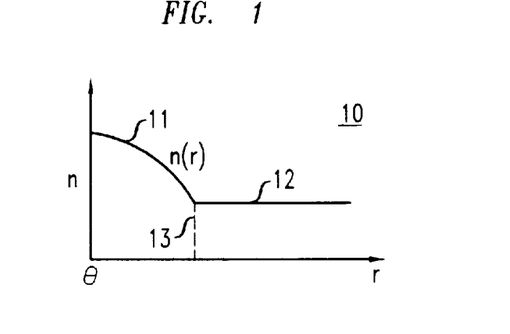
FIG. 1 schematically depicts an exemplary parabolic refractive index profile.

FIG. 1 shows an exemplary MM fiber refractive index profile with α-type core index. In FIG. 1, n is the refractive index, r is the radial coordinate, 11 is the core refractive index n(r), 12 is the cladding refractive index $n_{cladding}$, and 13 is the core/cladding interface. Silica-based optical fiber typically is contactingly surrounded by a polymer cladding. Such a cladding does not play a role in this application and will not be discussed further.

It will be appreciated that conventional MM transmission fibers have a structure that is essentially independent of the azimuthal and the longitudinal fiber coordinate, with any departure from azimuthal and/or longitudinal constancy being an undesirable manufacturing defect. However, optical fibers that have longitudinally varying structure are known, as are optical fibers that exhibit azimuthal variation. For an example of the former see for instance, U.S. Pat. No. 5,298,047 which discloses introduction of a permanent spin into the fiber for reduction of polarization mode dispersion. An example of the latter is polarization-maintaining fiber. See, for instance, D.N. Payne et al., *IEEE Journal of Quantum Electronics*, Vol. QE-18(4), April 1982, p. 477. Both types of fibers generally are single mode fibers.

An important feature of the method according to this invention is the introduction of perturbations into the MM optical fibers, such that substantial mode mixing occurs during operation of the fiber, i.e., during transmission of electromagnetic radiation of an operating wavelength λ. The mode mixing desirably comprises mixing the modes within a given mode group, as well as mixing of the mode groups. By way of example, fluctuations of the core diameter as a function of the longitudinal coordinate tend to produce mode coupling within mode groups, and microbends in the fiber tend to produce mode coupling between mode groups. For a discussion of mode coupling in MM optical fibers see, for instance, R. Olshansky, *Reviews of Modern Physics*, Vol. 51 (2), pp. 341–367 (1979).

Figure 2:
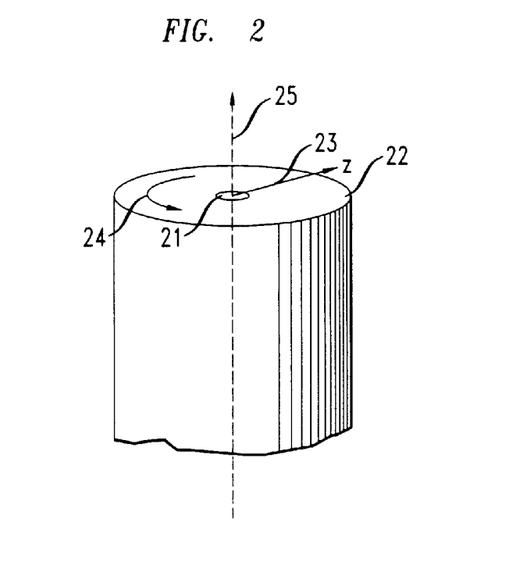
FIG. 2 schematically shows a portion of a MM preform (or MM fiber), indicating the radial, azimuthal and longitudinal coordinates.

FIG. 2 schematically shows a prior art MM preform or optical fiber, with numerals 21–25 referring, respectively, to the core, the cladding, the radial coordinate, the azimuthal coordinate and the longitudinal coordinate.

The goal of achieving high bandwidth through mode mixing in silica-based MM fibers can be achieved by introduction, in any appropriate manner, of suitable perturbations into the optical fiber. However, many of the known techniques for making MM fibers with mode-coupling perturbations are difficult to carry out in a manufacturing environment, and/or are difficult to incorporate into currently used fiber manufacturing processes. Thus, a method of introducing perturbations into MM fiber that can be carried out in a manufacturing environment and can be easily incorporated into a conventional process for making MM fiber is needed, and is disclosed herein.

Suitable ways of introducing such perturbations are a) carrying out the preform collapse while maintaining a reduced pressure (e.g., 0.1 atmospheres or less) in the interior of the preform tube, such that the collapsing preform assumes a non-circular cross section, followed by imposition of chirality on the fiber during drawing from the preform; and b) removing glass from the outside of a conventional preform rod such that the resulting shaped preform has non-circular (e.g., polygonal) cross section. Fiber is then drawn from the shaped preform, with the drawing temperature being sufficiently high such that the outside of the fiber becomes substantially circular and the core becomes non-circular. During drawing of the fiber from the preform, chirality is imposed on the fiber.

Figure 3:
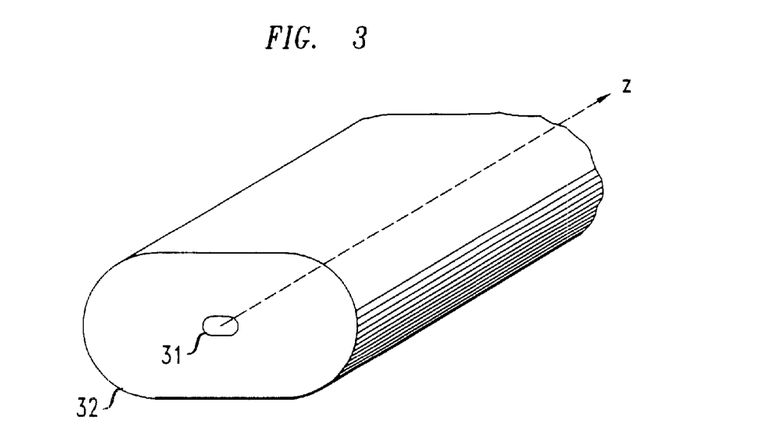
FIG. 3 schematically shows an exemplary MM preform (or MM fiber) with non-circular core and cladding.

FIG. 3 schematically depicts a collapsed non-circular optical fiber preform (or fiber drawn from the collapsed preform), with numerals 31 and 32 referring to the core material and the cladding material. The preform typically is produced by MCVD in conventional fashion. After deposition of the core material (and typically of some cladding material) the tubular preform of circular cross section is collapsed into a solid glass rod. During the collapse, conditions are selected such that at least part of the tubular body assumes non-circular shape. Typically this is achieved by maintaining a reduced pressure inside the tubular preform, at least for a portion of the collapse time. Subsequent to completion of the collapse the resulting glass body is mounted in a draw tower and fiber is drawn. The fiber is twisted relative to the preform, or the preform is twisted relative to the fiber, such that the resulting optical fiber has chiral structure, typically with azimuthal and radial perturbations along the longitudinal axis of the fiber.

Figure 4A:
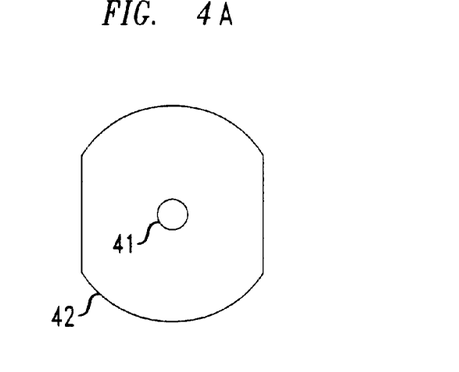
FIG. 4A schematically shows an exemplary shaped MM preform, and FIG. 4B schematically shows the MM fiber drawn from the shaped preform at relatively high temperature.

A further exemplary technique for making MM fibers with non-circular core cross section comprises making a conventional MM preform and collapsing the preform in conventional fashion. The resulting circularly symmetric glass rod is then shaped such that the rod no longer has circular symmetry. For instance, the rod can be shaped by grinding or by means of a plasma torch to have polygonal (e.g. hexagonal) cross section, or to have substantially oval cross section. FIG. 4A schematically shows a portion of a preform with substantially oval cross section. Numerals 41 and 42 refer to the (circularly symmetric) core and the cladding, respectively.

Figure 4B:
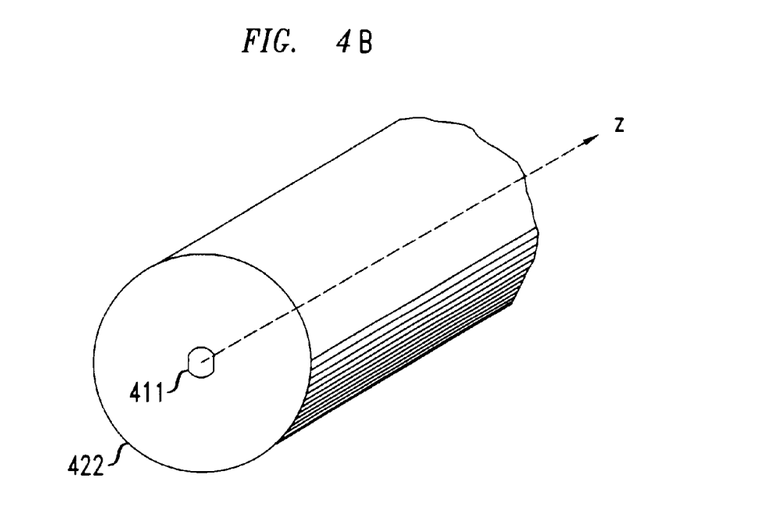

After completion of the shaping operation the shaped preform is mounted in a draw tower and optical fiber is drawn from the preform. The temperature of the hot zone will typically be relatively high (e.g., in the range 2100–2400° C.), selected such that the outside of the fiber assumes substantially circular shape (due to surface tension) and the core consequently becomes non-circular. This is shown in FIG. 4B, wherein numerals 411 and 422 refer to the non-circular core and the substantially circular cladding, respectively. Not only is the fiber drawn at relatively high temperature but chirality is imposed on the fiber during fiber drawing. This exemplarily is done by twisting the fiber relative to the preform, or by twisting the preform relative to the fiber. The resulting fiber typically has azimuthal and radial perturbations along the longitudinal coordinate of the fiber.

The imposition of chirality on the fiber can be achieved in any appropriate way. For instance, the preform in the draw furnace can be spun around on its axis. See, for instance, U.S. Pat. No. 4,504,300. In a currently preferred embodiment the fiber is alternately twisted clockwise and counterclockwise. See U.S. Pat. No. 5,298,047, which shows, inter alia, a draw tower that can alternately twist the fiber clockwise and counterclockwise by means of an oscillating guide roller. The alternating twist modulates the repeat length which typically yields enhanced mode mixing.

Figure 5:
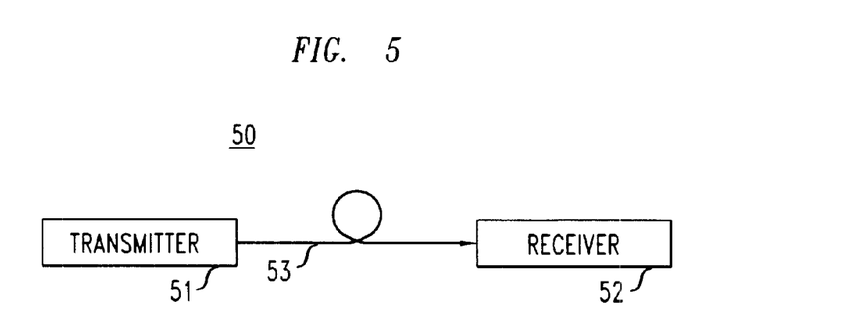
FIG. 5 schematically depicts an exemplary optical fiber communication system comprising MM fiber according to the invention.
Figure 6:
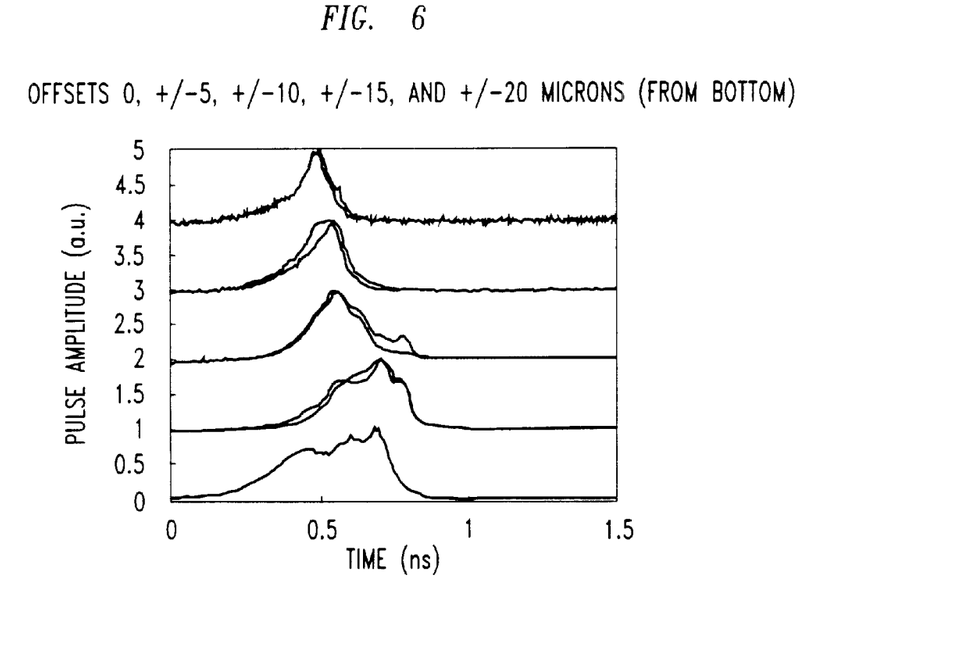
FIGS. 6–9 show pulse amplitude as a function of time, for various offsets, for multimode fiber produced under various conditions, with and without vacuum collapse, and with and without twisting.
Figure 7:
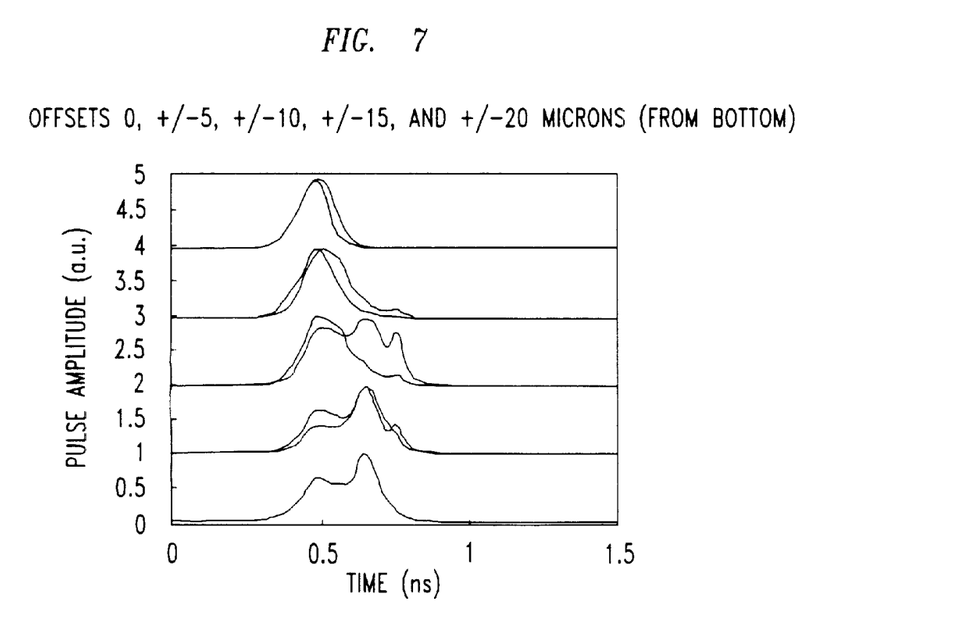
Figure 8:
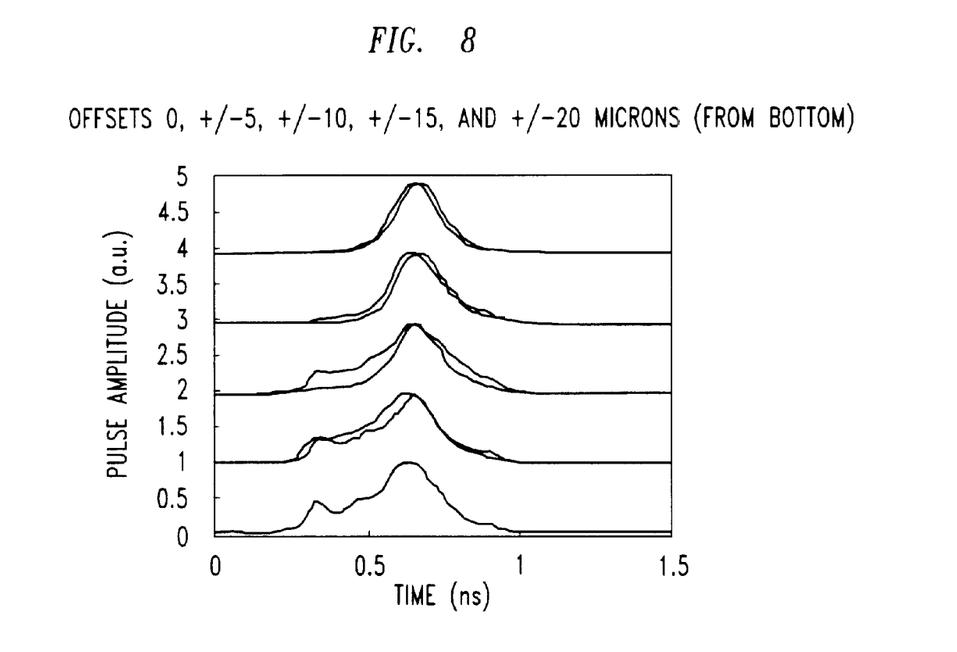
Figure 9:
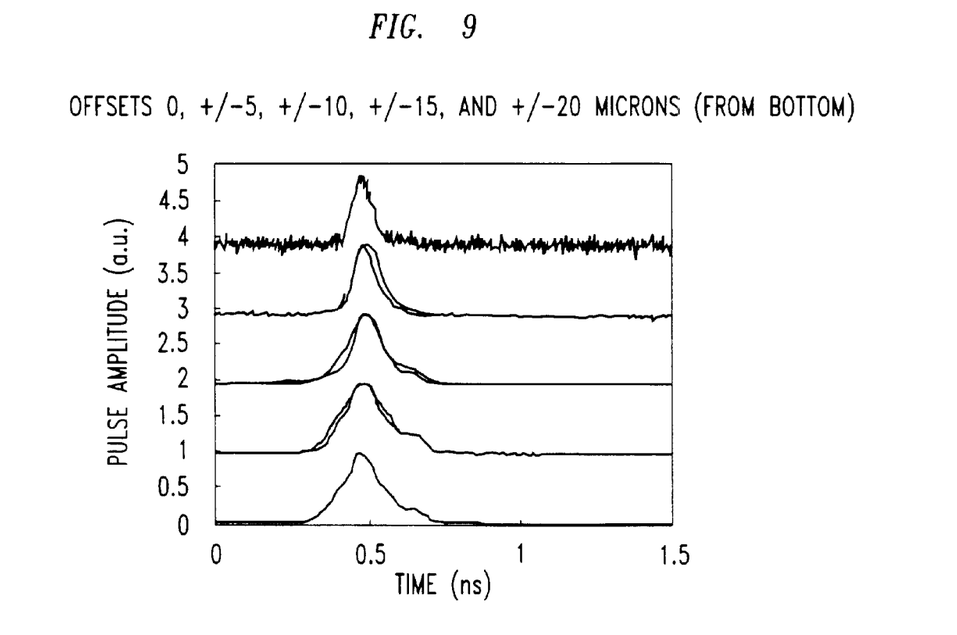
Figure 10:
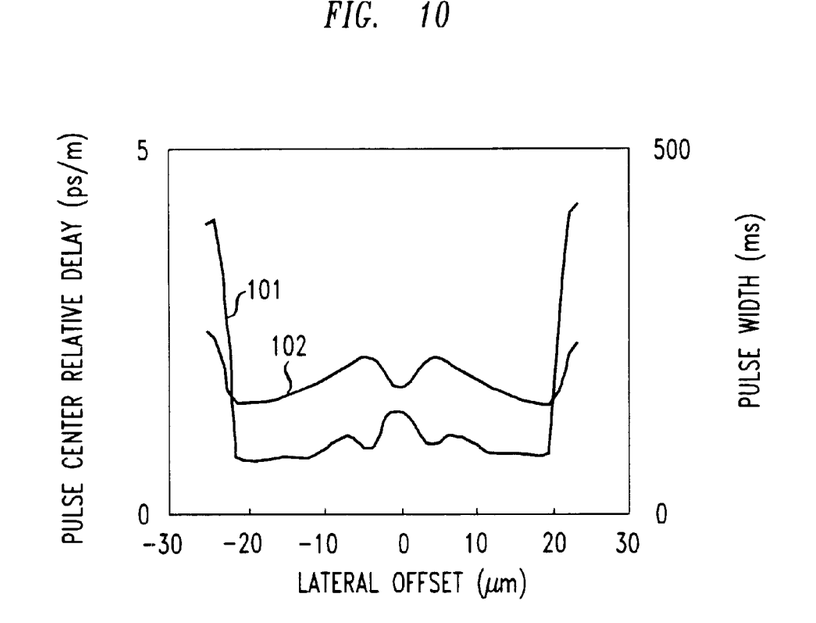
FIGS. 10–13 show pulse center differential mode dispersion and pulse width, as a function of lateral offset, for the multimode fibers of FIGS. 6–9, respectively.
Figure 11:
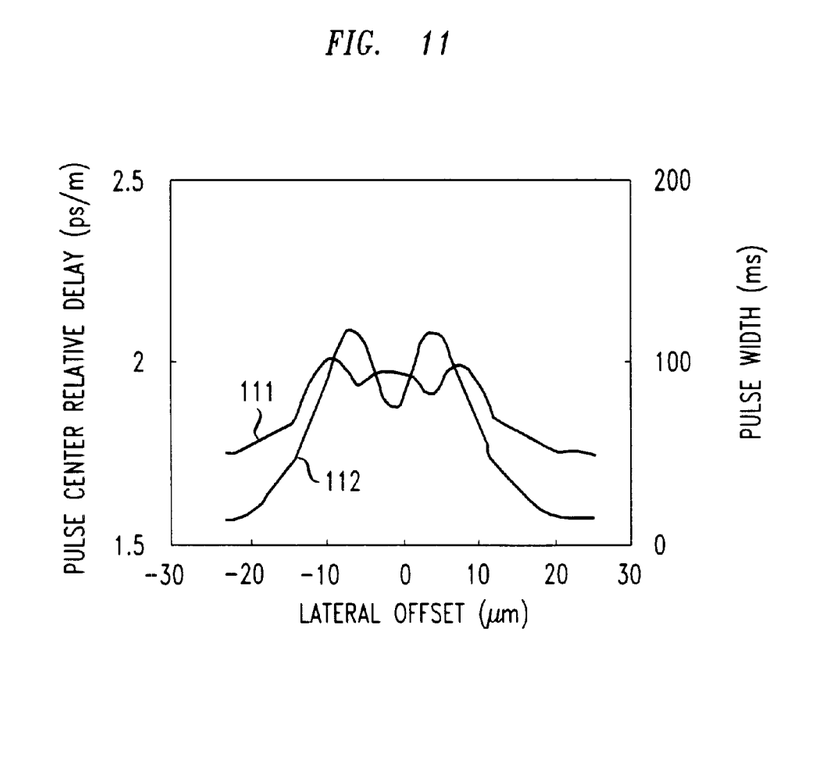
Figure 12:
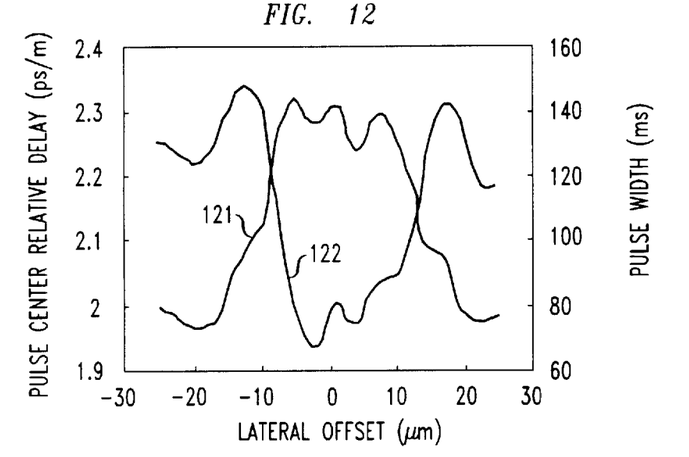
Figure 13:
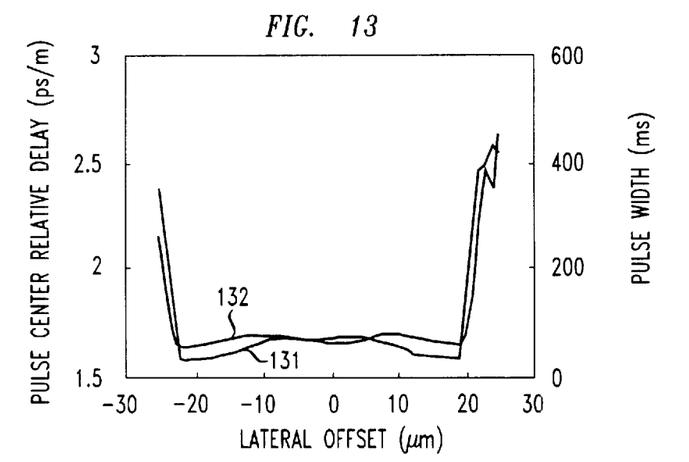

MM fiber according to the invention advantageously is used in a high speed optical fiber communication system, exemplarily a LAN. FIG. 5 schematically shows an exemplary optical fiber communication system 50 comprising a transmitter 51, a receiver 52, and MM optical fiber 53 signal-transmissively connecting transmitter and receiver.

EXAMPLE

A conventional tubular multimode preform was formed and divided into two parts before collapse. One of the two parts was collapsed in conventional fashion, the other was collapsed under vacuum. From each of the two collapsed preforms was drawn a length of fiber without twisting, as well as a similar length with twisting. Differential mode delay measurements were then carried out on 300 m lengths of the respective fibers. The vacuum collapse and subsequent fiber drawing resulted in core orality of 13.9%, whereas the core ovality was 4.6% without vacuum collapse. The draw speed and twisting were selected to result in 30 twists/m.

FIGS. 6–9 respectively pertain to fiber without vacuum collapse and without twisting, to fiber without vacuum collapse and with twisting, to fiber with vacuum collapse and without twisting, and to fiber with vacuum collapse and with twisting.

The figures show pulse amplitude as a function of time, for various offsets of the launched pulses. Each figure shows pulse amplitudes for 9 offsets (0, ±5 $\mu$m, ±10 $\mu$m, ±15 $\mu$m, and ±20 $\mu$m, from bottom to top). For purposes of the instant qualitative discussion it is not necessary to identify the pulses with corresponding positive and negative offsets. Inspection of FIGS. 6–9 shows that the pulses of FIG. 9 (vacuum collapsed, twisted during drawing) have substantially smaller pulse width than the pulses of the other figures, indicative of greater bandwidth of the vacuum collapsed and twisted MM fiber. The pulses of FIG. 9 also have considerably less structure than the pulses of FIGS. 6–8, also indicative of higher bandwidth. Furthermore, the relatively structure-free zero-offset pulse of FIG. 9 indicates a reduced effect of the (generally present) central index dip.

FIGS. 10–13 show corresponding data on pulse center differential mode dispersion (reference numerals 101, 111, 121 and 131, respectively) and pulse width (reference numerals 102, 112, 122 and 132, respectively), as a function of lateral offset. The pulse width data pertains to the right hand ordinate (in ps), and pulse center relative delay pertains to the left hand ordinate (in ps/m).

Inspection of FIGS. 10–13 shows that the vacuum collapsed twisted fiber (FIG. 13) has lower pulse width and lower differential mode dispersion than the other fibers, indicative of larger bandwidth for the vacuum collapsed and twisted fiber.

Figure 14:
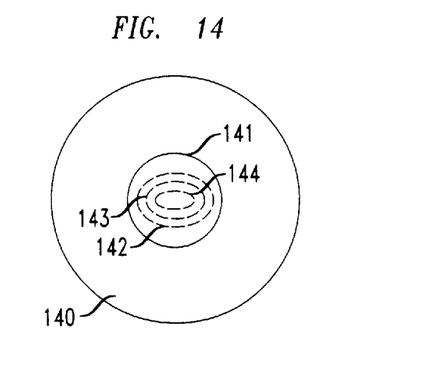
FIG. 14 schematically depicts a further exemplary embodiment of fiber according to the invention.

In a further exemplary embodiment of the invention the preform is made such that the core has circular circumference but has an index profile that increases in ovality from the circumference (where it typically is zero) to the center of the core. This is illustrated in FIG. 14, wherein reference numerals 140 and 141 refer, respectively, to the cladding and the circumference of the core, and numerals 142–144 refer to lines of equal refractive index. A preform according to FIG. 14 is exemplary of a preform that is made such that at least a portion of the preform has non-circular form. It will be understood that FIG. 14 also represents fiber drawn from the preform, the core of the fiber having non-circular cross-section.

A figure of merit (FOM) was defined as follows: Consider all of the pulses measured on the 300 m length of MM fiber. Tabulate the arrival time of the leading and trailing edges of the pulses at the half maximum power point. Calculate the maximum difference in time between the earliest arrival time of the leading edges and the latest arrival time of the trailing edges. This parameter is designated $T_{max}$. The FOM is then defined as FOM=$T_{max}$/P, where P=⅔ times the bit period. In the instant example, P=67 ps.

FOM=1 means that the total span of the pulses fits into ⅔ of the bit period, and FOM=10 means that the total span of the pulses is 10 times the width of the bit period. A small FOM is generally associated with large bandwidth.

The FOM for the four above-discussed MM fibers was determined, and found to decrease from no vacuum collapse/no twisting (FOM=7.0) to no vacuum collapse/twisting (FOM=5.4) to vacuum collapse/no twisting (FOM=4.8) to vacuum collapse/twisting (FOM=2.7).

It will be understood that the above described procedures and results are exemplary, and that practice of the invention does not require that various fiber types are formed from the same tubular preform.

We claim:

1. Method of making a silica-based multimode optical fiber having a core and a cladding that contactingly surrounds the core, the core having a radially varying refractive index; the method comprising
   a) providing a silica-based optical fiber preform; and
   b) drawing the optical fiber from the preform;
   c) step a) comprises shaping at least a portion of the preform into non-circular form; and
   d) step b) comprises drawing fiber from at least the portion of the preform such that the core of the optical fiber has non-circular cross-section, and such that a chiral structure is impressed on the optical fiber, whereby the multimode optical fiber has high bandwidth.

2. Method according to claim 1, wherein the fiber is drawn from a collapsed preform, and shaping the preform comprises applying, during at least a portion of preform collapse, reduced pressure to the inside of the preform, such that at least a portion of the core in the collapsed preform is non-circular.

3. Method according to claim 1, wherein the fiber is drawn from a collapsed preform, and shaping the preform comprises removing material from the outside of the collapsed preform, such that the collapsed preform has a circular core and a non-circular cladding.

4. Method according to claim 1, wherein the fiber is drawn from a collapsed preform, and shaping the preform comprises removing material from the outside of the collapsed preform, such that the collapsed preform has a circular core and a non-circular cladding.

5. Method according to claim 1, wherein impressing a chiral structure on the optical fiber comprises twisting the fiber alternately clockwise and counterclockwise as the fiber is drawn from the preform.

6. Method according to claim 1, wherein a repeat length is associated with the chiral structure, said repeat length being 10 cm or less.

* * * * *